(12) United States Patent
Chang (10) Patent No.: US 8,000,195 B2
(45) Date of Patent: Aug. 16, 2011

(54) SIGNAL PROCESSING SYSTEM

(75) Inventor: Chao-Huang Chang, Taipei (TW)

(73) Assignee: Inventec Corporation, Taipei (TW)

( * ) Notice: Subject to any disclaimer, the term of this patent is extended or adjusted under 35 U.S.C. 154(b) by 1338 days.

(21) Appl. No.: 11/523,405

(22) Filed: Sep. 18, 2006

(65) Prior Publication Data
US 2007/0273541 A1    Nov. 29, 2007

(30) Foreign Application Priority Data
May 24, 2006    (TW) .............................. 95118399 A (51) Int. Cl.
*G08B 21/00* (2006.01)

(52) U.S. Cl. ...................................... 369/53.1; 340/635
(58) Field of Classification Search ................. 369/53.1; 340/635, 815.45; 235/492
See application file for complete search history.

(56) References Cited

U.S. PATENT DOCUMENTS
6,867,704 B2 * 3/2005 Pellegrino ................ 340/815.45
* cited by examiner

*Primary Examiner* — William J Klimowicz
*Assistant Examiner* — Kim-Kwok Chu
(74) *Attorney, Agent, or Firm* — Peter F. Corless; Steven M. Jensen; Edwards Angell Palmer & Dodge LLP (57) ABSTRACT

A signal processing system applicable to an electronic system having a storage unit, an indicator light, and a driving circuit includes a first signal processing unit, a second signal processing unit, and a signal computing unit. The indicator light will light up, if the electronic system does not access the storage unit for data. The first signal processing unit is electrically connected to the driving circuit and configured to receive a first pulse signal while the electronic system is accessing the storage unit for data, charge/discharge and transform the first pulse signal, to output a second pulse signal. The second signal processing unit receives the second pulse signal, charges/discharges and transforms the second pulse signal, to output a third pulse signal. The signal computing unit receives and computes the second and third pulse signals to generate a fourth pulse signal for driving the indicator light to perceivably glitter.

9 Claims, 6 Drawing Sheets

SIGNAL PROCESSING SYSTEM

BACKGROUND OF THE INVENTION

1. Field of the Invention

The present invention relates to signal processing systems, and more particularly, to a signal processing system for use in an electronic system having a hard disk, a light emitting diode (LED), and a driving circuit for driving the LED to operate and indicate a state of use of the hard disk, so as to process pulse signals generated by the driving circuit and allow the processed pulse signals to drive the LED to glitter at a frequency suitable for a user to perceive.

2. Description of the Prior Art

A system (a computer system or a servo system) generally comprises three major components, namely a central processing unit (CPU), a hard disk, and a memory, which are equally important. The hard disk, the most important extrinsic storage device of the system (as opposed to other auxiliary storage devices, such as floppy disks, CD-ROMs, flash memory, and magnetic tapes), not only serves as the system's hub of data storage, but also stores most of the programs and data required for the system's operation.

In order to enable a system user to identify the current state of use of the system's hard disk (for example, whether or not a hard disk is present, and whether or not the system is accessing the hard disk for data). Systems nowadays employ mostly a driving circuit installed in system hardware architecture to generate, when the system is accessing the system's hard disk, a pulse signal ACTLED_N for driving a LED (a light-emitting diode) to operate and indicate the current state of use of the system's hard disk. For instance, in the event that the system does not have any hard disk, or electrical connection between the hard disk and the system is poor, the LED will not light up, thus informing the user that, for the time being, the system does not have any hard disk, or electrical connection between the hard disk and the system is poor. In the event that the system has a hard disk but the system is not accessing the hard disk for data, the driving circuit will generate a logic high (logic "1") signal for driving the LED to stay alight, thus informing the user that, for the time being, the system has a hard disk but the hard disk is idle. In the event that the system has a hard disk and is accessing the hard disk for data, the driving circuit will generate the pulse signal ACTLED_N for driving the LED to glitter, thus informing the user that, for the time being, the system is accessing the hard disk for data, that is, the hard disk is currently in use.

Figure 7:
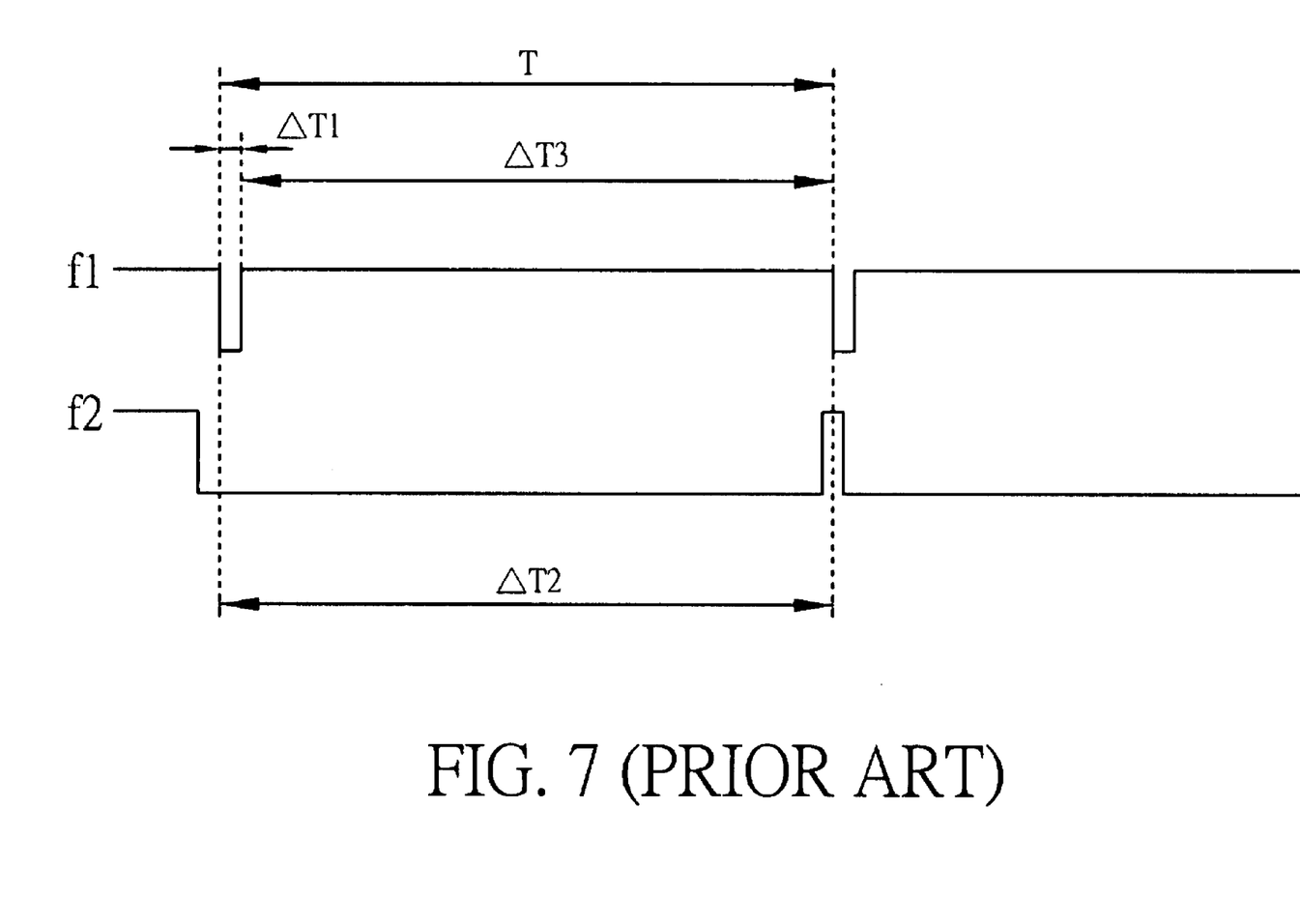
FIG. 7 (PRIOR ART) is a waveform diagram of pulse signals generated by a driving circuit of a conventional system.

Although the aforesaid conventional system has a mechanism for using a LED to indicate a state of use of a hard disk, the quantity of data for which the system accesses the hard disk varies and thus the pulse width of the pulse signal ACTLED_N generated by the driving circuit of the system varies, and in consequence the frequency at which the LED connected to the driving circuit glitters varies. Referring to FIG. 7, the system accesses the hard disk for a small amount of data, the waveform of the pulse signal ACTLED_N generated by the driving circuit is depicted by the waveform of a signal f1 shown in FIG. 7. The signal f1 is a logic low (logic "0") signal only within duration $\Delta T1$, where the duration $\Delta T1$ accounts for a small part of a period T, and thus the LED is off for a short while. As a result, the user is unable to readily perceive the glitter of the LED in the short duration $\Delta T1$, and thus the user mistakenly thinks that the hard disk fails to respond to the system when the system attempts to access the hard disk. And further, the user mistakenly thinks that there is a hard disk failure, and thus the user starts to perform laborious, time-consuming follow-up jobs, such as testing and repairing the hard disk. Referring to FIG. 7, alternatively, the system accesses the hard disk for a large amount of data, the waveform of the pulse signal ACTLED_N generated by the driving circuit is depicted by the waveform of a signal f2 shown in FIG. 7. The signal f2 is a logic low signal within duration $\Delta T2$, where the duration $\Delta T2$ accounts for a large part of the period T, and thus the LED is off for a long while. As a result, the user mistakenly thinks that the hard disk is absent from the system, or that electrical connection between the hard disk and the system is poor. Similarly, the user may therefore mistakenly think that there is a hard disk failure, and thus the user starts to perform laborious, time-consuming follow-up jobs, such as testing and repairing the hard disk.

In short, a conventional system does not provide users with an efficient mechanism for indicating the state of use of a hard disk. In consequence, users are seldom efficiently and directly informed of the current state of use of a hard disk by means of a LED and thereby are likely to handle the hard disk wrongly, for example, testing the hard disk to see if the hard disk fails or electrically connects to the system poorly.

Accordingly, an issue that faces the industry and needs an urgent solution is related to endeavors-to provide a mechanism for indicating the state of use of a hard disk so as to overcome various drawbacks of the prior art.

SUMMARY OF THE INVENTION

In light of the aforesaid drawbacks of the prior art, it is a primary objective of the present invention to provide a signal processing system for use in an electronic system having a storage unit, an indicator light, and a driving circuit, so as to process pulse signals generated by the driving circuit and allow the processed pulse signals to drive the indicator light to glitter at a frequency suitable for the user to perceive, thus efficiently indicating a state of use of the storage unit of the electronic system.

Another objective of the present invention is to provide a signal processing system conducive to user perception of the glitter of the indicator light.

In order to achieve the above and other objectives, the present invention discloses a signal processing system for use in an electronic system having a storage unit, an indicator light, and a driving circuit, wherein if the electronic system does not access the storage unit for data, the driving circuit will drive the indicator light of the electronic system to light up. The signal processing system comprises a first signal processing unit, a second signal processing unit, and a signal computing unit. The signal processing unit is electrically connected to the driving circuit and configured to receive, while the electronic system is accessing the storage unit for data, a first pulse signal generated by the driving circuit, perform a charging/discharging and transformation process with respect to the first pulse signal received, so as to generate and output a second pulse signal. The second signal processing unit receives the second pulse signal outputted by the first signal processing unit, performs a charging/discharging and transformation process with respect to the second pulse signal received, so as to generate and output a third pulse signal. The signal computing unit receives the second and third pulse signals outputted by the first and second signal processing units and computes the second and third pulse signals received so as to generate a fourth pulse signal for driving the indicator light of the electronic system to glitter at a frequency suitable for a user to perceive, thus indicating a state of use of the storage unit of the electronic system.

The first signal processing unit comprises a signal buffer unit, a first charging/discharging unit, and a first signal transformation unit.

The signal buffer unit receives the first pulse signal outputted by the driving circuit, buffers the first pulse signal received so as to maintain outputted signal amplitude, and then outputs the first pulse signal buffered. The signal buffer unit is a buffer.

The first charging/discharging unit receives the first pulse signal buffered and outputted by the signal buffer unit and performs a charging/discharging process with respect to the first pulse signal buffered and received so as to generate and output a first charging/discharging signal. The first charging/discharging unit comprises a resistor, a capacitor, and a peripheral circuit thereof.

The first signal transformation unit receives the first charging/discharging signal outputted by the first charging/discharging unit, transforms the first charging/discharging signal received into the second pulse signal, and outputs the second pulse signal. The first signal transformation unit comprises two Schmitt trigger inverters connected in series and a peripheral circuit thereof.

The second signal processing unit comprises a switching unit, a second charging/discharging unit, and a second signal transformation unit.

The switching unit receives the second pulse signal outputted by the first signal processing unit so as to allow the second pulse signal to control an on-state and an off-state of the switching unit. The switching unit comprises a transistor, and a related peripheral electronic component and circuit.

The second charging/discharging unit performs a charging/discharging process, when the switching unit is at the off-state, so as to generate and output a second charging/discharging signal. The second charging/discharging unit comprises a resistor, a capacitor, and a peripheral circuit thereof.

The second signal transformation unit receives the second charging/discharging signal outputted by the second charging/discharging unit, transforms the second charging/discharging signal received into the third pulse signal, and outputs the third pulse signal. The second signal transformation unit comprises two Schmitt trigger inverters and a peripheral circuit thereof.

The signal computing unit is an OR gate.

In short, a signal processing system of the present invention processes a first pulse signal generated by a driving circuit of an electronic system, so as to generate a fourth pulse signal for driving an indicator light of the electronic system to glitter at a frequency suitable for a user to perceive the glitter of the indicator light, thus allowing the user to perceive the glitter of the indicator light efficiently and directly and thereby be kept informed of a state of use of a storage unit of the electronic system.

DETAILED DESCRIPTION OF THE EMBODIMENTS

The present invention is herein illustrated with a specific embodiment, so that one skilled in the pertinent art can easily understand other advantages and effects of the present invention from the disclosure of the invention.

Figure 1:
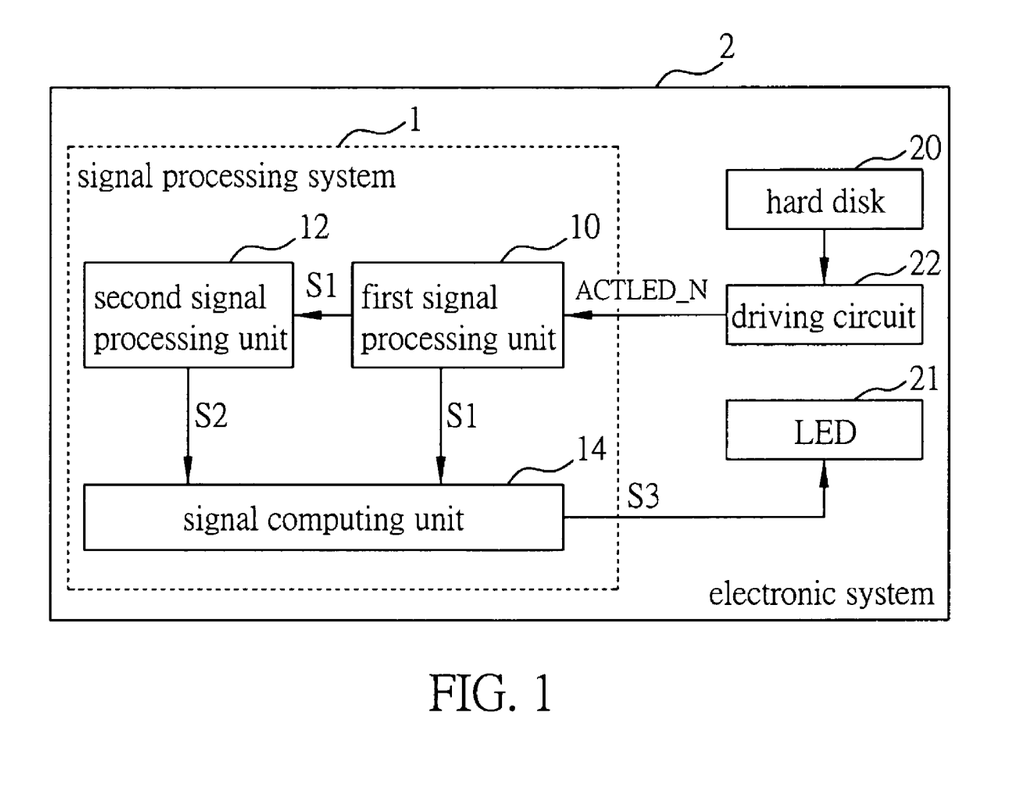
FIG. 1 is a block diagram of the basic structure of a signal processing system in accordance with the present invention.

FIG. 1 is a block diagram of the basic structure of a signal processing system 1 in accordance with the present invention.

Referring to FIG. 1, the signal processing system 1 is for use in an electronic system 2. The electronic system 2 comprises a storage unit 20 (for example, SATA hard disk or SAS hard disk), an indicator light 21 (for example, LED), and a driving circuit 22. The electronic system 2 is one selected from the group consisting of a personal computer, a notebook computer, and a server. The driving circuit 22 is a circuit for generating a pulse signal to drive the indicator light 21 to operate. In the event that the electronic system 2 does not access the storage unit 20 for data, the driving circuit 22 will generate a logic high (logic "1") signal for driving the indicator light 21 to light up. In the event that the electronic system 2 accesses the storage unit 20 for data, the driving circuit 22 will process a pulse signal ACTLED_N to be generated, such that the processed pulse signal ACTLED_N can drive the indicator light 21 to glitter at a frequency suitable for a user to perceive. Accordingly, the user is kept informed of a state of use of the storage unit 20, using the indicator light 21, while the electronic system 2 is accessing the storage unit 20 for a large or even small amount of data. The mechanism for driving and operating the indicator light 21 and the driving circuit 22 and the interaction therebetween represents a known skill and is unlikely to be a focus of discussion on the present invention and thereby is not herein explained in detail. To make the drawings and the description simpler, the following embodiment is hereinafter illustrated in such a way that a hard disk functions as the storage unit 20 and a LED as the indicator light 21, but the following embodiment is not intended to limit the present invention.

As shown in FIG. 1, the signal processing system 1 comprises a first signal processing unit 10, a second signal processing unit 12, and a signal computing unit 14. The first signal processing unit 10 is electrically connected to the driving circuit 22 and configured to receive, while the electronic system 2 is accessing the hard disk 20 for data, the pulse signal ACTLED_N generated by the driving circuit 22 and perform charging/discharging and transformation processes with respect to the pulse signal ACTLED_N received, so as to generate and output a pulse signal S1. The second signal processing unit 12 receives the pulse signal S1 outputted by the first signal processing unit 10 and performs charging/ discharging and transformation processes with respect to the pulse signal S1 received, so as to generate and output a pulse signal S2.

The signal computing unit 14 receives the pulse signals S1 and S2 outputted by the first and second signal processing units 10 and 12 respectively, computes the pulse signals S1 and S2 so as to generate a pulse signal S3, and outputs the pulse signal S3 to the LED 21 of the electronic system 2, such that the pulse signal S3 drives the LED 21 to glitter at a frequency suitable for the user to perceive. The user is able to perceive the glitter of the LED 21 efficiently and directly and thereby is kept informed of the state of use of the hard disk 20 of the electronic system 2. Details of the first signal processing unit 10, the second signal processing unit 12, and the signal computing unit 14 are described later in this specification.

Figure 2:
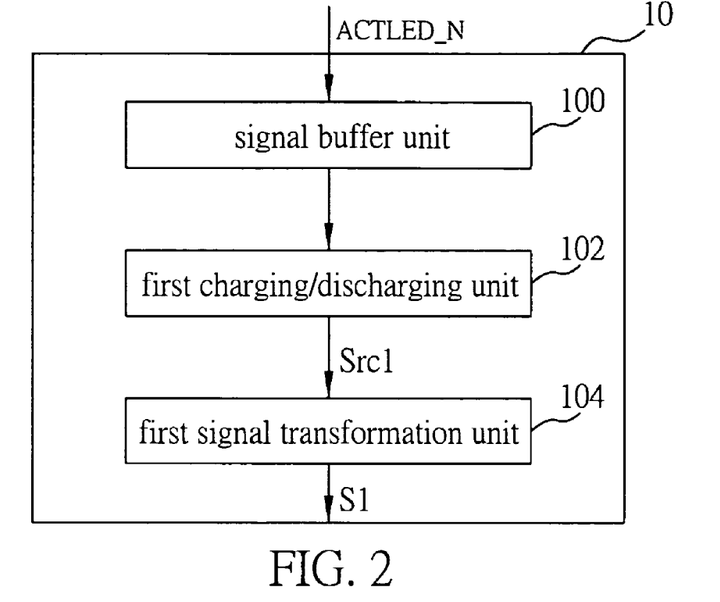
FIG. 2 is a block diagram of the basic structure of a first signal processing unit shown in FIG. 1.

FIG. 2 is a block diagram of the basic structure of the first signal processing unit 10 shown in FIG. 1. The first signal processing unit 10 comprises a signal buffer unit 100, a first charging/discharging unit 102, and a first signal transformation unit 104.

Figure 4:
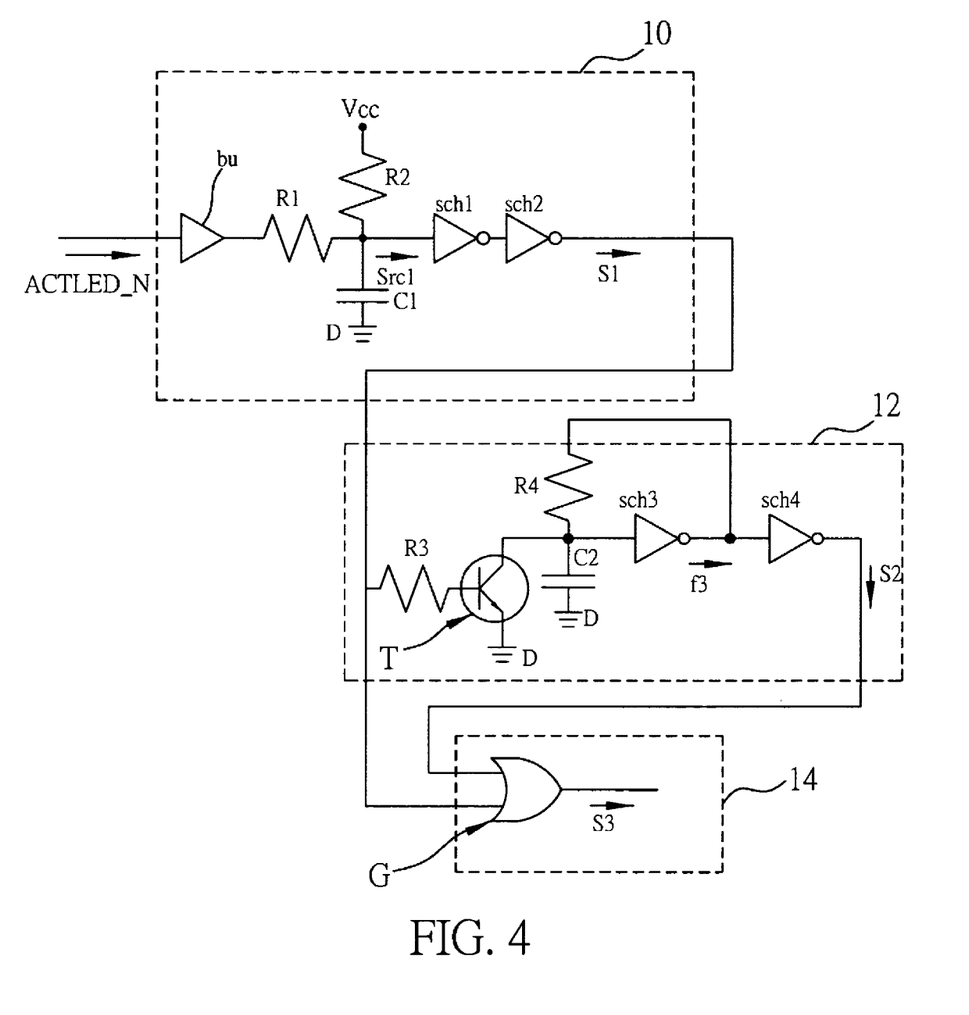
FIG. 4 is a specific circuit for a signal processing system in accordance with the present invention.

The signal buffer unit 100 receives the pulse signal ACTLED_N outputted by the driving circuit 22, maintains the amplitude of the pulse signal ACTLED_N received, and then outputs the pulse signal ACTLED_N. As shown in FIG. 4, the signal buffer unit 100 is a buffer Bu. The buffer Bu may be replaced with a circuit or electronic device having similar functionalities, if necessary.

The first charging/discharging unit 102 receives the pulse signal ACTLED_N buffered and outputted by the signal buffer unit 100 and performs a charging/discharging process with respect to the pulse signal ACTLED_N buffered and received so as to generate and output a first charging/discharging signal Src1. As shown in FIG. 4, the first charging/discharging unit 102 is an RC charging/discharging circuit which comprises resistors R1 and R2, a capacitor C1, and a peripheral circuit thereof. One end of the resistor R1 (with a resistance of 330Ω, for example) is connected to one end of the capacitor C1 (with a capacitance of 1 μF, for example). The other end of the capacitor C1 is connected to a grounding terminal D. As a result, the resistor R1 and the capacitor C1 together form an RC discharging route. One end of the resistor R2 (with a resistance of 10 KΩ, for example) is connected to a voltage source Vcc of 5V, for example. The other end of the resistor R2 is connected to the capacitor C1. As a result, the resistor R2 and the capacitor C1 together form an RC charging route.

The first signal transformation unit 104 receives the first charging/discharging signal Src1 outputted by the first charging/discharging unit 102, transforms the first charging/discharging signal Src1 received into the pulse signal S1, and outputs the pulse signal S1. As shown in FIG. 4, the first signal transformation unit 104 is a trigger circuit which comprises, for example, two Schmitt trigger inverters Sch1 and Sch2 connected in series and rectifies the first charging/discharging signal Src1 generated by the first charging/discharging unit 102, or in other words the first charging/discharging signal Src1 is rectified to become the pulse signal S1 whenever the first charging/discharging signal Src1 attains a specific level. After being processed by the buffer Bu, the pulse signal ACTLED_N outputted by the driving circuit 22 still maintains a constant signal output. The RC discharging route formed by the resistor R1 and the capacitor C1 performs a discharging process with respect to the pulse signal ACTLED_N. Hence, in the event that a logic "0" signal appears at one end of the capacitor C1, then the voltage source Vcc, coupled with the RC charging route formed by the resistor R2 and the capacitor C1, will gradually turn the logic "0" signal into a logic "1" signal. Then, the RC charging/discharging circuit comprising the resistors R1 and R2 and the capacitor C1 performs a charging/discharging process with respect to the pulse signal ACTLED_N such that the first charging/discharging signal Src1 is generated at one end of the capacitor C1. Afterward, the two Schmitt trigger inverters Sch1 and Sch2 connected in series invert the first charging/discharging signal Src1 twice, so as to generate the pulse signal S1 which is then outputted by the Schmitt trigger inverter Sch2.

Figure 3:
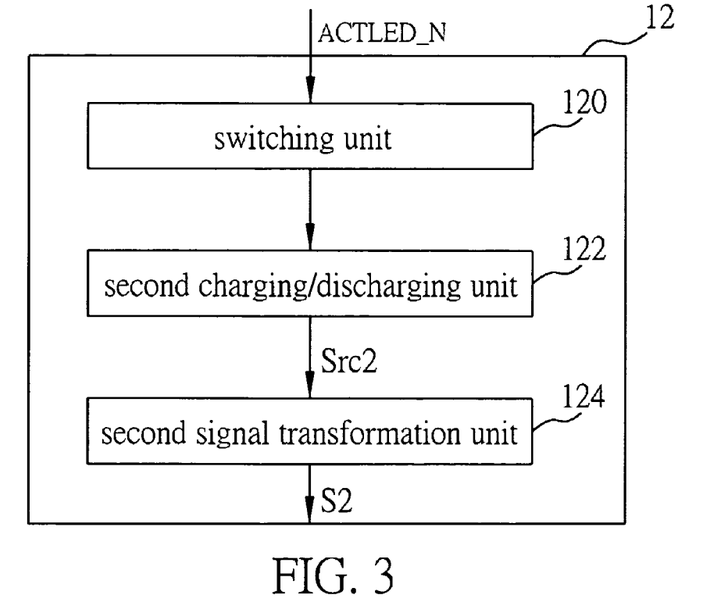
FIG. 3 is a block diagram of the basic structure of a second signal processing unit shown in FIG. 1.

FIG. 3 is a block diagram of the basic structure of the second signal processing unit 12 shown in FIG. 1. The second signal processing unit 12 comprises a switching unit 120, a second charging/discharging unit 122, and a second signal transformation unit 124.

The switching unit 120 receives the pulse signal S1 outputted by the first signal processing unit 10 so as to allow the pulse signal S1 to control an on-state and an off-state of the switching unit 120. As shown in FIG. 4, the switching unit 120 is a switching circuit which comprises a transistor Tr, a related peripheral electronic component like a resistor R3, and a circuit. The base of the transistor Tr is connected to the output of the Schmitt trigger inverter Sch2 through the resistor R3 (with a resistance of 4.7 KΩ, for example). The emitter of the transistor Tr is connected to the grounding terminal D. The collector of the transistor Tr is connected to one end of the capacitor C2 (with a capacitance of 0.22 μF, for example). The other end of the capacitor C2 is connected to grounding terminal D.

The second charging/discharging unit 122 performs a charging/discharging process, when the switching unit 120 is at the off-state, so as to generate and output a second charging/discharging signal Src2. As shown in FIG. 4, the second charging/discharging unit 122 is a RC charging/discharging circuit which comprises a resistor R4, a capacitor C2, and a peripheral circuit thereof. One end of the capacitor C2 is connected to one end of the resistor R4 (with a resistance of 1 KΩ, for example) and the input of the Schmitt trigger inverter Sch3. The output of the Schmitt trigger inverter Sch4 is connected to the other end of the resistor R4 and the input of the Schmitt trigger inverter Sch4. The resistor R4 and the capacitor C2 together form RC charging/discharging routes while the transistor Tr is at the off-state.

The second signal transformation unit 124 receives the second charging/discharging signal Src2 outputted by the second charging/discharging unit 122, transforms the second charging/discharging signal Src2 received into the pulse signal S2, and outputs the pulse signal S2. As shown in FIG. 4, the second signal transformation unit 124 is a trigger circuit which comprises two Schmitt trigger inverters Sch3 and Sch4. Any signal outputted by the Schmitt trigger inverter Sch3 is fed back to the second charging/discharging unit 122.

In this embodiment, the signal computing unit 14 is an OR gate G as shown in FIG. 4. The OR gate G may be replaced with a circuit or electronic device having similar functionalities, if necessary.

In this embodiment, the transistor Tr is controlled by the pulse signal S1 outputted by the Schmitt trigger inverter Sch2. In the event that the pulse signal S1 is logic "1", the transistor Tr will be at the on-state; with both the collector and the emitter of the transistor Tr being grounded, one end of the capacitor C2 always has a logic "0" signal, whereas the Schmitt trigger inverter Sch3 always outputs a logic "1" signal, and the RC charging/discharging circuit formed by the resistor R4 and the capacitor C2 does not perform any charging/discharging process. In the event that the pulse signal S1 is logic "0", the transistor Tr will be at the off-state, and the Schmitt trigger inverter Sch3 will output a logic "1" signal and thereby drive the RC charging/discharging circuit formed by the resistor R4 and the capacitor C2 to perform a charging/discharging process; in consequence one end of the capacitor C2 generates the second charging/discharging signal Src2. Afterward, the two Schmitt trigger inverters Sch3 and Sch4 invert the second charging/discharging signal Src2 twice, so as to generate the pulse signal S2 which is then outputted by the Schmitt trigger inverter Sch4. And further, in this embodiment, the Schmitt trigger inverter Sch3 inverts, while the RC charging/discharging circuit formed by the resistor R4 and the capacitor C2 is performing a charging/discharging process, the second charging/discharging signal Src2 generated by the RC charging/discharging circuit so as to generate a pulse signal f3 and feed back the pulse signal f3 to the other end of the resistor R4 of the RC charging/discharging circuit, thus allowing the RC charging/discharging circuit to proceed with the charging/discharging process while the transistor Tr is at the off-state. After being inverted by the Schmitt trigger inverter Sch4, the pulse signal f3 is turned into the pulse signal S2, and then the pulse signal S2 is outputted.

Both inputs of the OR gate G are connected to the respective outputs of the Schmitt trigger inverters Sch2 and Sch4, not only to receive the pulse signals S1 and S2 outputted by the Schmitt trigger inverters Sch2 and Sch4, but also to compute logically the pulse signals S1 and S2. As a result, the pulse signal S3 is generated and then outputted by the OR gate G to the LED 21 of the electronic system 2, for driving the LED 21 to glitter at a frequency suitable for the user to perceive.

The present invention adopts resistors of different resistance and capacitors of different capacitance when necessary, so as to generate the pulse signal S3 for driving the LED 21 to glitter at a frequency suitable for the user to perceive. For instance, the resistance of the resistor R1 is 330Ω so as to enable the discharging route formed by the resistor R1 and the capacitor C1 to discharge swiftly. Similarly, the resistance of the resistor R2 is 10 KΩ so as to enable the charging route formed by the resistor R2 and the capacitor C1 to charge slowly. Accordingly, adjustments are made in the pulse width of the pulse signals generated as a result of the transformation of the first charging/discharging signal Src1 (outputted by the capacitor C1) by the Schmitt trigger inverters Sch1 and Sch2. For instance, an increase or decrease in the pulse width of the pulse signals relative to the pulse width of the initial pulse signal ACTLED_N generated by the driving circuit 22.

Figure 5:
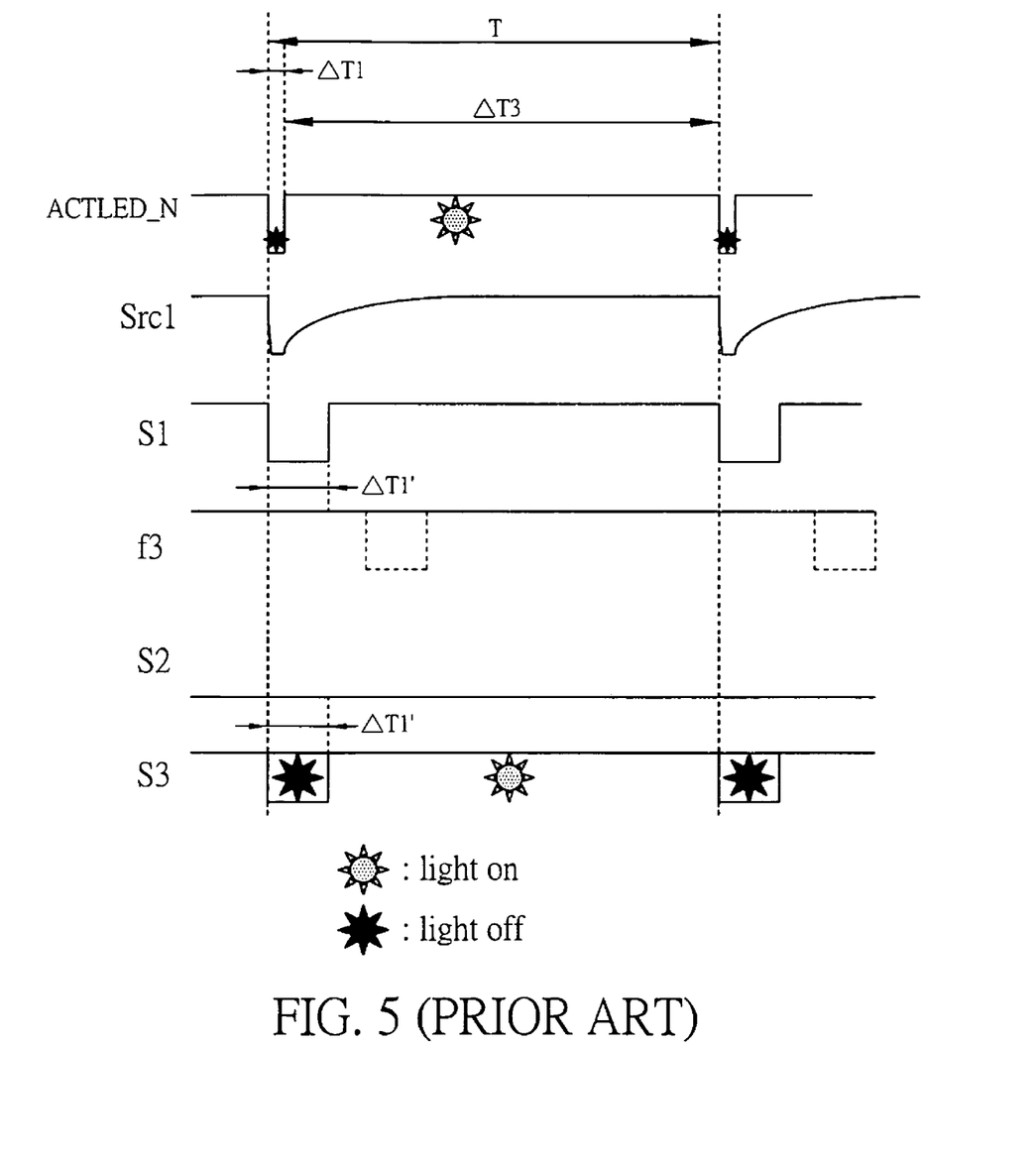
FIG. 5 (PRIOR ART) is a schematic view of the waveforms of the pulse signal ACTLED_N generated by a conventional driving circuit, as well as the waveforms of the signal f3, the first charging/discharging signal Src1, the second charging/discharging signal Src2, and the pulse signals S1, S2 and S3 generated while the electronic system is accessing a hard disk for a small amount of data, corresponding to the circuit shown in FIG. 4.

Referring to FIG. 5, where the electronic system 2 is accessing a storage unit 20 thereof (for example, a hard disk) for a small amount of data, the driving circuit 22 of the electronic system 2 generates the pulse signal ACTLED_N (with a period T) as shown in the drawing. The pulse width of the pulse signal ACTLED_N is quite small and thereby equals duration ΔT1 (the pulse signal ACTLED_N is logic "0" within duration ΔT1 but is logic "1" within duration ΔT3, wherein duration ΔT1+duration ΔT3=period T). The circuitry of the signal processing system of the present invention allows the pulse width of the pulse signal ACTLED_N to be adjusted.

As shown in FIG. 5, the pulse signal ACTLED_N is buffered by the buffer Bu and subjected to the charging/discharging process performed by the resistors R1 and R2 and the capacitor C1 so as to generate the first charging/discharging signal Src1, and the first charging/discharging signal Src1 is transformed by the Schmitt trigger inverters Sch1 and Sch2 into the pulse signal S1 (with a period T and a pulse width ΔT1'). Then, the pulse signal S1 is outputted by the Schmitt trigger inverter Sch2.

As disclosed above, in the event that the pulse signal S1 is logic "1", the transistor Tr will be at the on-state, the RC charging/discharging circuit formed by the resistor R4 and the capacitor C2 will be idle; in consequence the signal f3 outputted by the Schmitt trigger inverter Sch3 stays at logic "1". Once the pulse signal S1 switches from logic "1" to logic "0", the transistor Tr will be at the off-state, the RC charging/discharging circuit formed by the resistor R4 and the capacitor C2 will start to perform the charging/discharging process, and the signal f3 outputted by the Schmitt trigger inverter Sch3 will vary and be antiphased with the second charging/discharging signal Src2 outputted by one end of the capacitor C2. Inasmuch as the electronic system 2 accesses the hard disk 20 for a small amount of data, the duration in which the RC charging/discharging circuit formed by the resistor R4 and the capacitor C2 performs a charging/discharging process is so short that the second charging/discharging signal Src2 generated by the RC charging/discharging circuit formed by the resistor R4 and the capacitor C2 is erased as soon as the pulse signal S1 switches from logic "0" to logic "1", thus keeping the signal f3 outputted by the Schmitt trigger inverter Sch3 at logic "1" and the pulse signal S2 outputted by the Schmitt trigger inverter Sch4 at logic "0".

The OR gate G computes logically the pulse signals S1 and S2 and then outputs the pulse signal S3 (with a period T and a pulse width ΔT1') as shown in FIG. 5. Compared to the initial pulse signal ACTLED_N generated by the driving circuit 22, the pulse width ΔT1' of the pulse signal S3 is efficiently increased, thus prolonging the duration in which the LED 21 (driven by the pulse signal S3) is off. As a result, the user can efficiently and directly perceive the glitter of the LED 21 while the electronic system 2 is accessing the hard disk 20 for data. Accordingly, the present invention overcomes the drawback of the prior art, that is, where a conventional system accesses a hard disk for a small amount of data, the pulse width of a pulse signal generated by a driving circuit and configured to drive a LED to glitter is so small that the LED is off for just a short while, and thus users fail to effectively and directly perceive the glitter of the LED. In consequence the users mistakenly judge that the hard disk does not respond to the conventional system.

Figure 6:
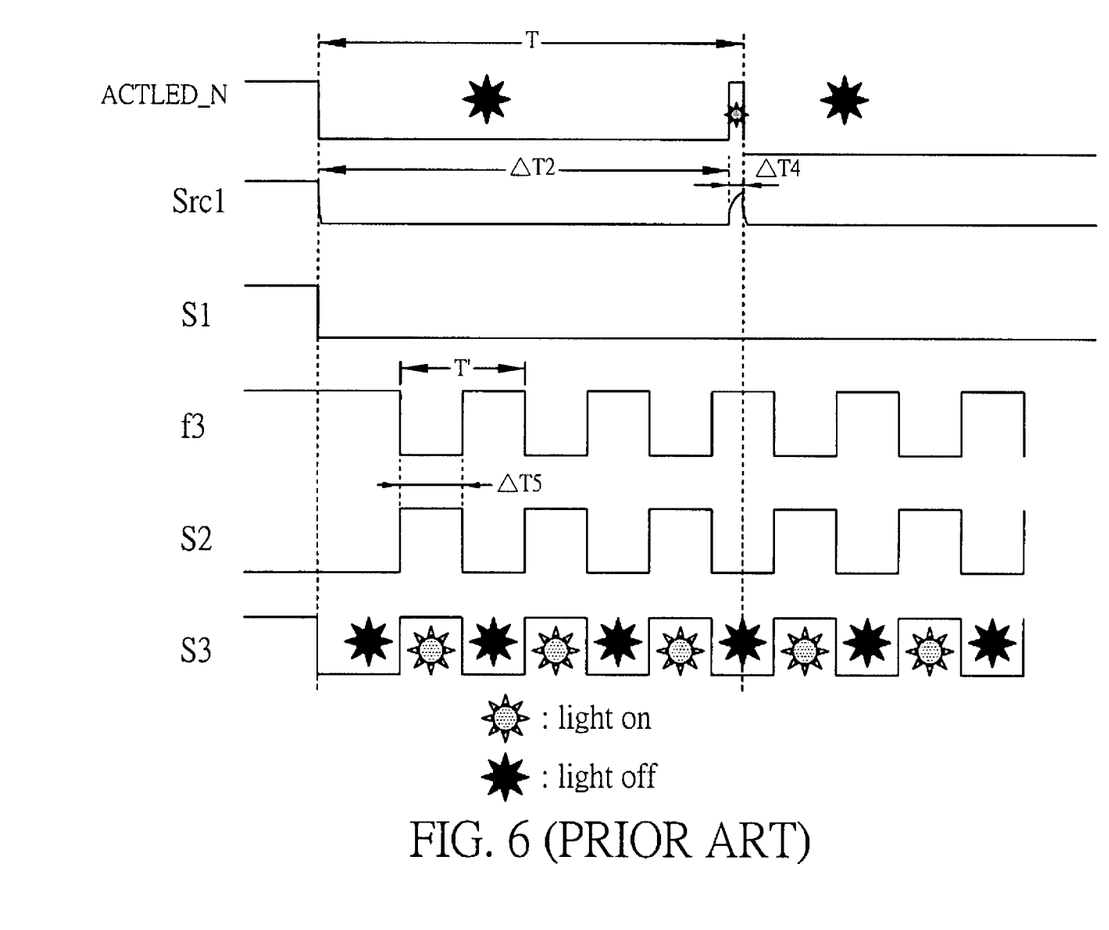
FIG. 6 (PRIOR ART) is a schematic view of the waveforms of the pulse signal ACTLED_N generated by a conventional driving circuit, as well as the waveforms of the signal f3, the first charging/discharging signal Src1, the second charging/discharging signal Src2, and the pulse signals S1, S2 and S3 generated while the electronic system is accessing a hard disk for a large amount of data, corresponding to the circuit shown in FIG. 4.

Referring to FIG. 6, in the event that the electronic system 2 accesses the hard disk 20 for a large amount of data, the driving circuit 22 of the electronic system 2 will generate the pulse signal ACTLED_N (which has a period T), wherein the pulse width ΔT2 of the pulse signal ACTLED_N is so large as to, basically, account for the whole period T. The pulse signal ACTLED_N is logic "0" within the pulse width ΔT2 and is logic "1" within the pulse width ΔT4, wherein pulse width ΔT2+pulse width ΔT4=period T. Accordingly to the present invention, the pulse signal ACTLED_N is processed, and the processed pulse signal ACTLED_N drives the LED 21 of the electronic system 2 to glitter at a frequency suitable for the user to perceive.

Referring to FIG. 6, the pulse signal ACTLED_N is buffered by the signal buffer unit 100 and subjected to the charging/discharging process performed by the resistors R1 and R2 and the capacitor C1 so as to generate the first charging/discharging signal Src1, and the Schmitt trigger inverters Sch1 and Sch2 transform the first charging/discharging signal Src1 into the pulse signal S1 which is outputted by the Schmitt trigger inverter Sch2 afterward. Upon commencement of the duration ΔT2, the pulse signal ACTLED_N switches from logic "1" to logic "0", so does the first charging/discharging signal Src1 (outputted by the capacitor C1) because of the operation of the discharging route (formed by the resistor R1 and the capacitor C1). The logic "0" signal persists until the duration ΔT4 begins. The commencement of the duration ΔT4 sees the pulse signal ACTLED_N switching from logic "0" to logic "1". At this point, the voltage source Vcc allows the resistor R2 to charge the capacitor C1 such that the first charging/discharging signal Src1 which is meanwhile having logic "0" begins to increase in amplitude gradually. However, the charging duration ΔT4 is so short that there is little variation in the first charging/discharging signal Src1 in duration ΔT4. In consequence, the pulse signal S1, which results from the transformation of the first charging/discharging signal Src1 by the Schmitt trigger inverters Sch1 and Sch2, remains a logic "0" throughout the period T.

Referring to FIG. 6, since the pulse signal S1 remains a logic "0" throughout the period T, the transistor Tr is at the off-state throughout the period T. Hence, the RC charging/discharging circuit formed by the resistor R4 and the capacitor C2 starts to perform the charging/discharging process so as to allow the capacitor C2 to generate the periodic second charging/discharging signal Src2. At this point, the signal f3 outputted by the Schmitt trigger inverter Sch4 varies, and is antiphased, with the second charging/discharging signal Src2 outputted by the capacitor C2. The signal f3 has a period T' (the period T' is equal to the period of the second charging/discharging signal Src2) and a pulse width ΔT5. The signal f3 is turned into the pulse signal S2 (with a period T' and a pulse width ΔT5), when processed by the Schmitt trigger inverter Sch4.

The OR gate G logically computes the pulse signals S1 and S2 and then outputs the pulse signal S3 (with a period T' and a pulse width ΔT5) as shown in FIG. 6.

As regards the electronic system 2 accessing the hard disk 20 for data, the present invention discloses as follows: the initial pulse signal ACTLED_N generated by the driving circuit 22 is processed and turned into the pulse signal S3 having a period T', wherein the duration T is a multiple of the period T', and thus in the duration T the LED 21 driven by the pulse signal S3 glitters at a certain frequency suitable for the user to perceive, with a view to informing the user of a state of use of the hard disk 20. Accordingly, the present invention overcomes the drawback of the prior art, that is, where a conventional system accesses a hard disk for a large amount of data, the pulse width of a pulse signal generated by a driving circuit and configured to drive a LED to glitter is so large that the LED is off for a long while, and thus users fail to effectively and directly perceives the glitter of the LED. In consequence the users mistakenly judge that the hard disk is absent, or electrically disconnected, from the conventional system.

Accordingly, the present invention discloses a signal processing system which comprises a first signal processing unit, a second signal processing unit, and a signal computing unit. The signal processing system turns a pulse signal ACTLED_N generated by a driving circuit of an electronic system into a pulse signal of a specific pulse width, such that the pulse signal drives a LED of the electronic system to glitter at a frequency suitable for a user to perceive. In the event that the electronic system accesses the hard disk for data, the user will perceive the glitter of the LED efficiently and directly and thereby will be informed that the hard disk is in use. The present invention overcomes the drawback of the prior art, that is, where a conventional system accesses a hard disk for a small or large amount of data, the pulse width of a pulse signal ACTLED_N generated by a driving circuit of the conventional system and configured to directly drive a LED to glitter is so small or large that the LED is off for a duration which is too short or too long, and thus a user mistakenly judges that the hard disk does not respond to the conventional system, or that the hard disk is absent (or electrically disconnected) from the conventional system.

The foregoing specific embodiment is only illustrative of the features and functions of the present invention but is not intended to restrict the scope of the present invention. It is apparent to those skilled in the art that all modifications and variations made in the foregoing embodiment according to the spirit and principle in the disclosure of the present invention should fall within the scope of the appended claims.

What is claimed is:

1. A signal processing system for use in an electronic system having a storage unit, an indicator light, and a disk driving circuit, wherein if the electronic system does not access the storage unit for data, the signal processing system will drive the indicator light of the electronic system to light up, the signal processing system comprising:

a first signal processing unit electrically connected to the disk driving circuit and configured to receive, while the electronic system is accessing the storage unit for data, a first pulse signal generated by the disk driving circuit, charge/discharge and transform the first pulse signal received, so as to generate and output a second pulse signal;

a second signal processing unit configured to receive the second pulse signal outputted by the first signal processing unit, charge/discharge and transform the second pulse signal received, so as to generate and output a third pulse signal; and a signal computing unit for receiving the second and third pulse signals outputted by the first and second signal processing units and computing the second and third pulse signals received so as to generate a fourth pulse signal for driving the indicator light of the electronic system to glitter at a frequency suitable for a user to perceive, wherein the first signal processing unit comprises:

a signal buffer unit for receiving the first pulse signal outputted by the disk driving circuit, buffering the first pulse signal received so as to maintain outputted signal amplitude, and then outputting the first pulse signal buffered;

a first charging/discharging unit for receiving the first pulse signal buffered and outputted by the signal buffer unit and charging/discharging with respect to the first pulse signal buffered and received so as to generate and output a first charging/discharging signal; and a first signal transformation unit for receiving the first charging/discharging signal outputted by the first charging/discharging unit, transforming the first charging/discharging signal received into the second pulse signal, and outputting the second pulse signal.

2. The signal processing system of claim 1, wherein the signal buffer unit is a buffer.

3. The signal processing system of claim 1, wherein the first charging/discharging unit comprises a resistor, a capacitor, and a peripheral circuit thereof.

4. The signal processing system of claim 1, wherein the first signal transformation unit comprises two Schmitt trigger inverters connected in series and a peripheral circuit thereof.

5. The signal processing system of claim 1, wherein the second signal processing unit comprises:

a switching unit for receiving the second pulse signal outputted by the first signal processing unit so as to allow the second pulse signal to control an on-state and an off-state of the switching unit;

a second charging/discharging unit for charging/discharging, when the switching unit is at the off-state, so as to generate and output a second charging/discharging signal; and a second signal transformation unit for receiving the second charging/discharging signal outputted by the second charging/discharging unit, transforming the second charging/discharging signal received into the third pulse signal, and outputting the third pulse signal.

6. The signal processing system of claim 5, wherein the switching unit comprises a transistor, and a related peripheral electronic component and circuit.

7. The signal processing system of claim 5, wherein the second charging/discharging unit comprises a resistor, a capacitor, and a peripheral circuit thereof.

8. The signal processing system of claim 5, wherein the second signal transformation unit comprises two Schmitt trigger inverters and a peripheral circuit thereof.

9. The signal processing system of claim 1, wherein the signal computing unit is an OR gate.

* * * * *